United States Patent
Takishima et al.

(10) Patent No.: US 6,898,247 B2
(45) Date of Patent: May 24, 2005

(54) APPARATUS FOR DIVIDING, COMPRESSING AND TRANSMITTING VIDEO DATA

(75) Inventors: Yasuhiro Takishima, Saitama (JP);
Tetsuji Yamashita, Saitama (JP);
Shigeyuki Sakazawa, Saitama (JP);
Masahiro Wada, Saitama (JP)

(73) Assignee: KDDI Corporation, Tokyo (JP)

( * ) Notice: Subject to any disclaimer, the term of this patent is extended or adjusted under 35 U.S.C. 154(b) by 462 days.

(21) Appl. No.: 09/963,576

(22) Filed: Sep. 27, 2001

(65) Prior Publication Data

US 2002/0054645 A1 May 9, 2002

(30) Foreign Application Priority Data

Sep. 29, 2000 (JP) ........................................ 2000-299456

(51) Int. Cl.$^7$ ................................................ H04N 7/12
(52) U.S. Cl. ............. 375/240.27; 375/240; 375/240.12; 375/240.16
(58) Field of Search ............................ 375/240, 240.27, 375/240.12, 240.16; 382/244

(56) References Cited

U.S. PATENT DOCUMENTS 4,903,317 A * 2/1990 Nishihara et al. ........... 382/244
6,480,541 B1 * 11/2002 Girod et al. ............ 375/240.12

* cited by examiner

Primary Examiner—Allen Wong
(74) Attorney, Agent, or Firm—Westerman, Hattori, Daniels & Adrian, LLP

(57) ABSTRACT

A first encoding section encodes an original picture S(1) and outputs it to a communication line of a first channel. The encoded image data is decoded in a first decoding section. This decoded data C(1) is input to a first compensation section. The first compensation section uses the original picture S(1) and the decoded data C(1) as the input, and performs calculation of the following expression (1) to thereby generate a first compensated original picture S(2):

$$S(i+1) = \left(S(1) \times i - \sum_{k=1}^{i} C(k)\right) / (N - i) + S(1) \quad (1)$$

wherein i=2 to N, and N denotes the total number of channels in image encoding.

The first compensated original picture S(2) is encoded in a second encoding section and output from a communication line of a second channel. Thereafter, similar operation is performed for the total number of channels N. According to this invention, there can be provided an apparatus for dividing, compressing and transmitting video data that can sufficiently improve the encoding efficiency, without requiring preferential transmission of the basic data.

2 Claims, 4 Drawing Sheets

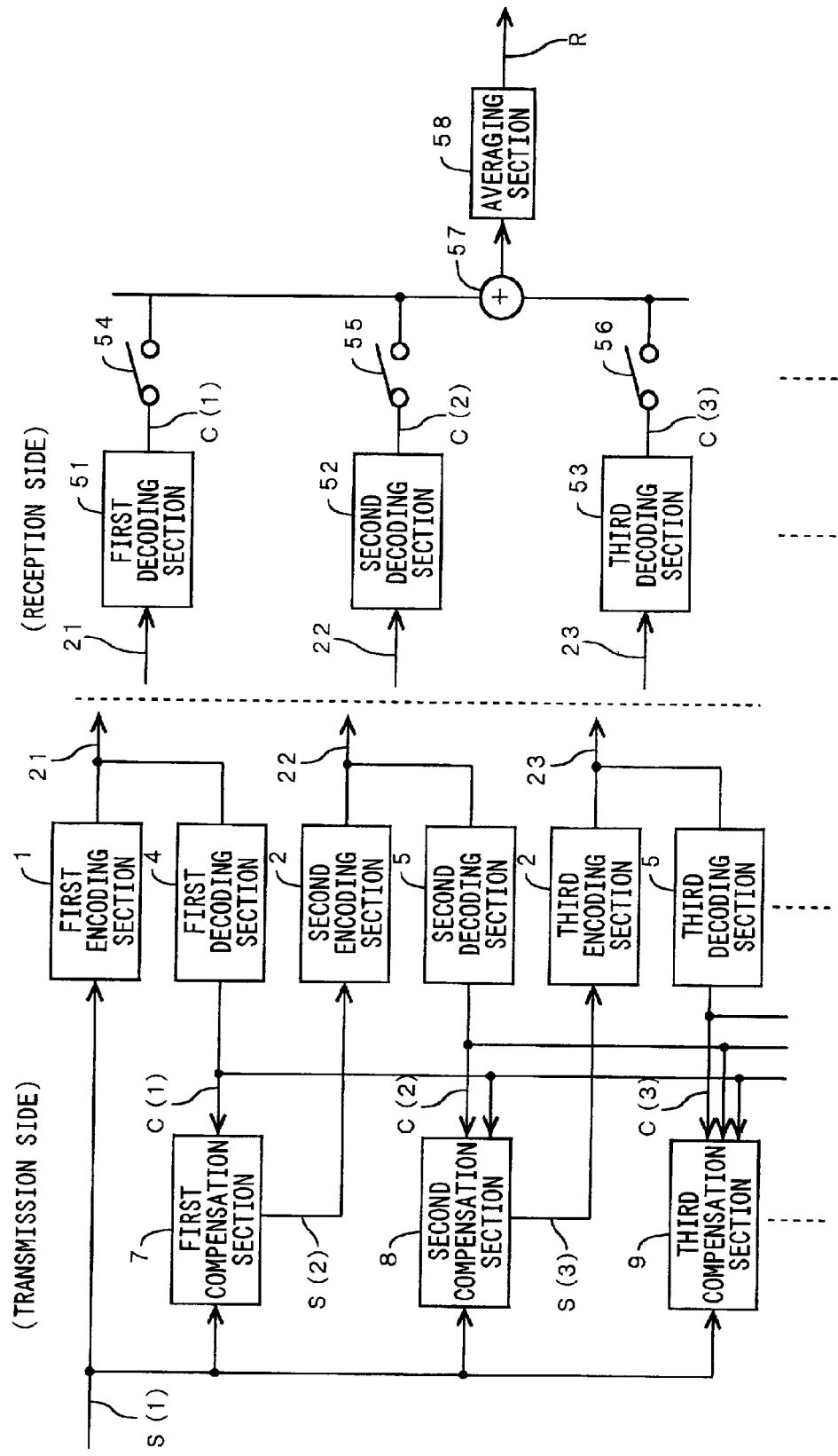

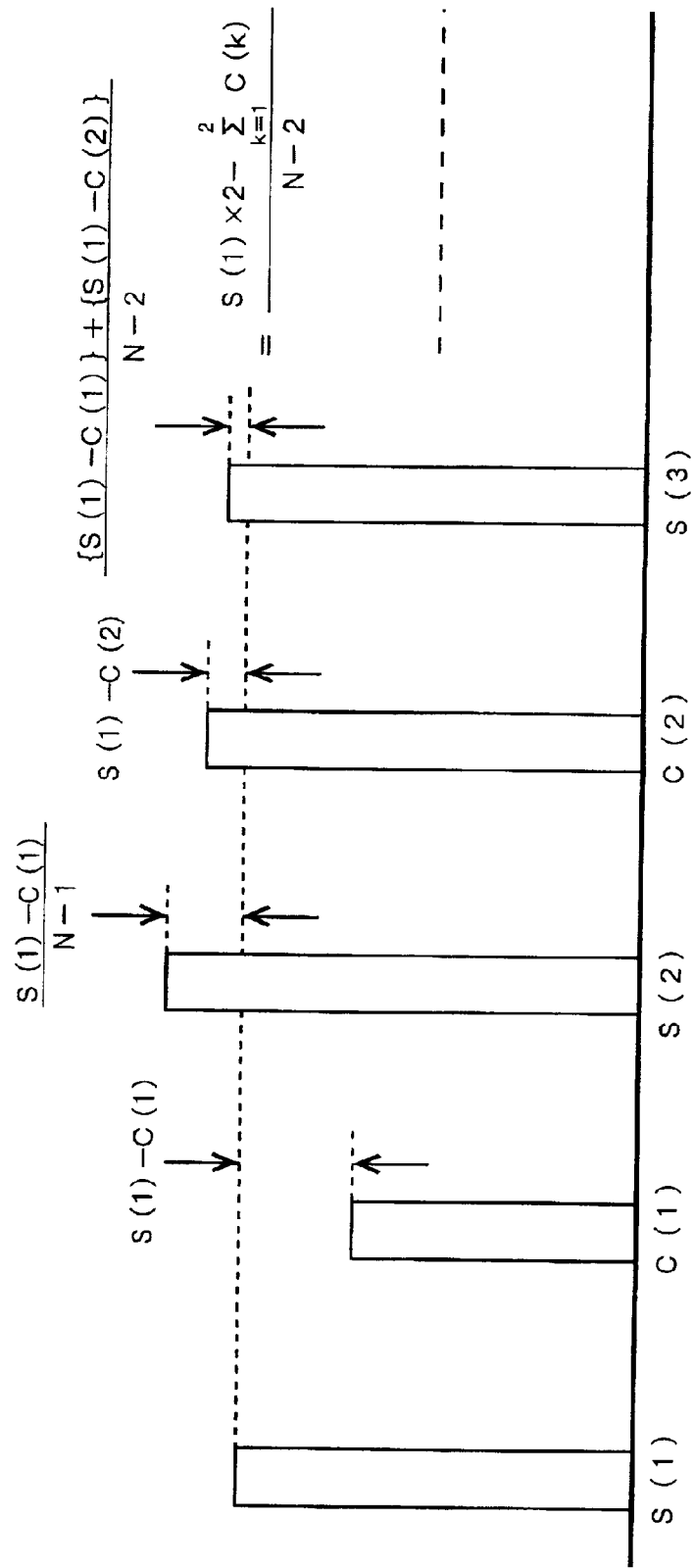

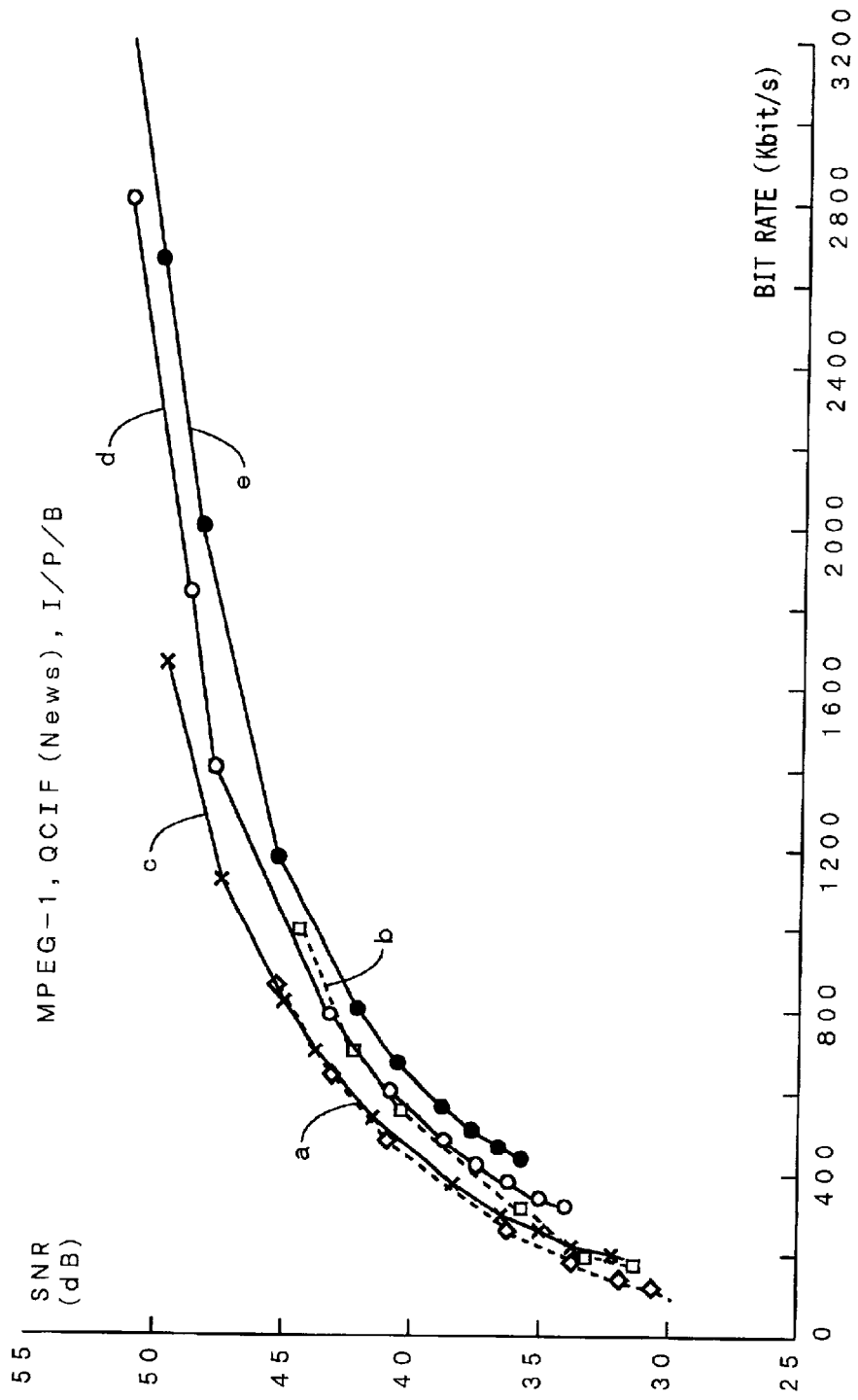

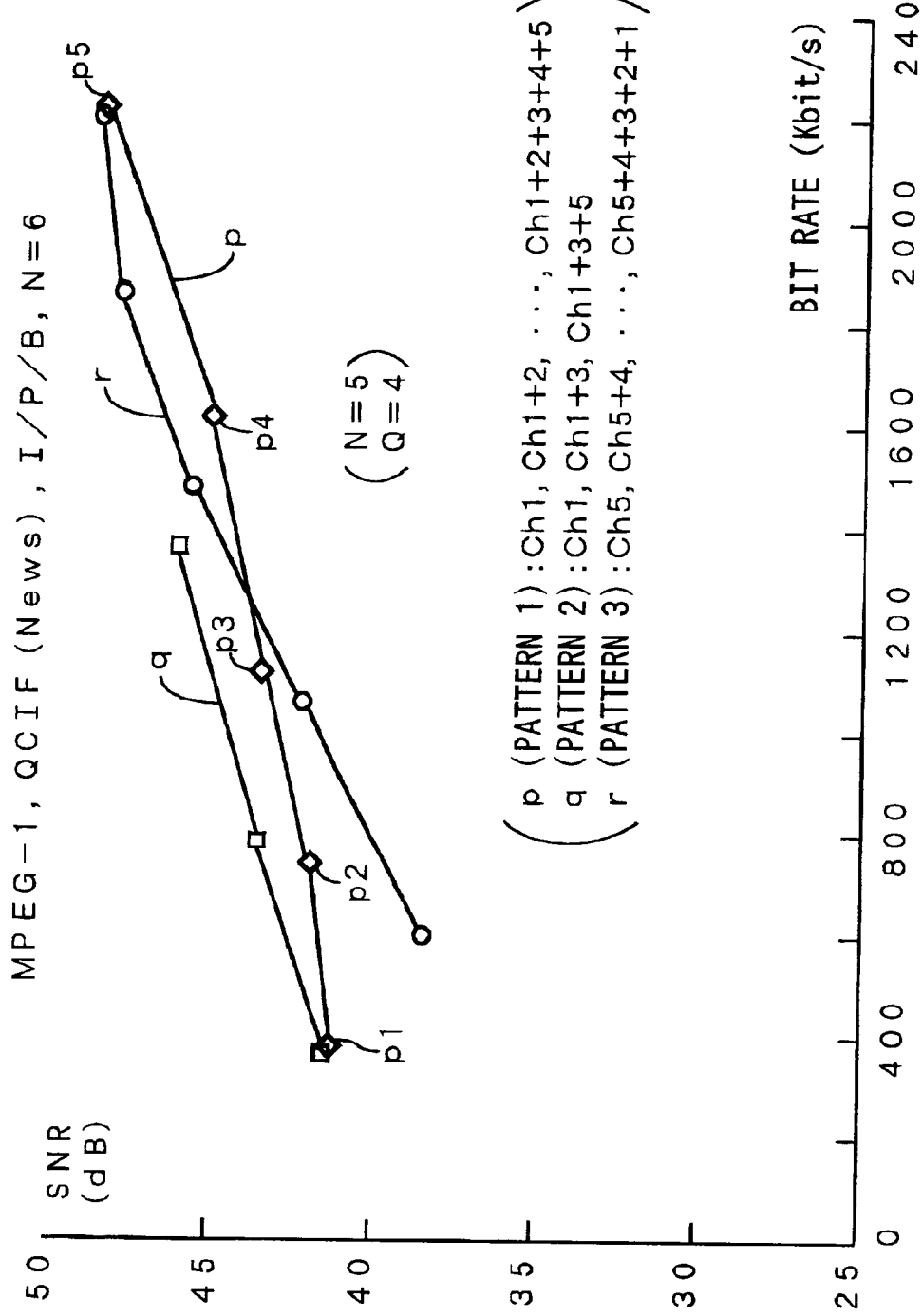

APPARATUS FOR DIVIDING, COMPRESSING AND TRANSMITTING VIDEO DATA

BACKGROUND OF THE INVENTION

1. Field of the Invention

The present invention relates to an apparatus for dividing, compressing and transmitting video data that improves encoding efficiency without requiring preferential transmission of basic data.

2. Description of the Related Art

In an environment where the transmission quality largely varies (particularly, in an environment where the transmission speed varies largely), a method for enabling reception of images having an image quality corresponding to its quality has been heretofore studied, and as one method, application of scalability encoding has been tried. Conventional scalability encoding (hereinafter, referred to as "first scalability encoding") is divided largely into the followings:

1) time scalability capable of selecting the resolution in the direction of time stepwise;

2) space scalability for changing the space resolution;

3) data partitioning for dividing the frequency elements; and

4) SNR scalability for selecting encoding distortion stepwise.

However, these scalability encoding makes normal reception of the basic data on a reception side a precondition. Therefore, on a transmission side, it is necessary to transmit the basic data preferentially.

On the other hand, scalability encoding in which the above-described basic data is not necessarily transmitted preferentially (hereinafter, referred to as "second scalability encoding") has been proposed. This method is referred to as "flat multi-scalable encoding" and uses transmission using a redundant system. This method, however, transmits data encoded respectively independently, via a corresponding channel, respectively, and the reception side performs processing for averaging these data. Therefore, there is a problem in that it is not sufficient in view of the encoding efficiency.

As described above, the first scalability encoding method has a problem in that the basic data must be transmitted preferentially, and the second scalability encoding method has a problem in that the encoding efficiency is not sufficient.

SUMMARY OF THE INVENTION

It is an object of the present invention to provide an apparatus for dividing, compressing and transmitting video data that can sufficiently improve the encoding efficiency, without requiring preferential transmission of the basic data.

In order to achieve the object, this invention is characterized in that an apparatus for dividing, compressing and transmitting video data that uses a plurality of channels for transmission, at least comprises: a first encoding section for encoding an original picture and transmitting it with a first channel; a first compensation section for generating a first compensated original picture obtained by adding and subtracting to/from said original picture a value obtained by dispersing an encoding error occurred in said first encoding section to the remaining channels; and a second encoding section for encoding said first compensated original picture and transmitting it through a second channel.

According to the invention, an apparatus for dividing, compressing and transmitting video data that can sufficiently improve the encoding efficiency without requiring preferential transmission of the basic data can be provided.

BRIEF DESCRIPTION OF THE DRAWINGS

FIG. 1 is a block diagram showing a construction of one embodiment of the present invention;

FIG. 2 is a diagram representing the operation on the transmission side in FIG. 1;

FIG. 3 is a graph comparing the encoding efficiency by means of the conventional time scalability and the encoding efficiency obtained by the present invention; and FIG. 4 is a graph representing changes in the encoding efficiency of patterns 1, 2 and 3 obtained on the reception side.

DETAILED DESCRIPTION OF THE PREFERRED EMBODIMENT

The present invention will now be described in detail, with reference to the drawings. FIG. 1 is a block diagram showing a construction of one embodiment of the present invention, and constructions on the transmission side and on the reception side are shown. The present invention is characterized by the construction on the transmission side.

An encoding apparatus on the transmission side comprises: first, second and third encoding sections 1, 2 and 3 in MPEG2 or the like; first, second and third decoding sections 4, 5 and 6 such as a local decoder in MPEG2 or a decoder for decoding a bit stream; and first, second and third compensation sections 7, 8 and 9.

The first encoding section 1 encodes an original picture S(1) and outputs it to a communication line 21 of a first channel. The encoded image data is decoded in the first decoding section 4. This decoded data C(1) is input to the first compensation section 7. To the first compensation section 7 are input the original picture S(1) and the decoded data C(1). The first compensation section 7 performs calculation of an expression (1) described below to generate a first compensated original picture S(2).

$$S(i+1) = \left(S(1) \times i - \sum_{k=1}^{i} C(k)\right) \Big/ (N-i) + S(1) \quad (1)$$

where, i=2 to N, and N denotes the total number of channels in the image encoding.

The first compensated original picture S(2) is encoded in the second encoding section 2, and output from a communication line 22 of a second channel.

Then, the image data encoded in the second encoding section 2 is decoded in the second decoding section 5, and the decoded data C(2) is input to the second compensation section 8. To the second compensation section 8 are input the original picture S(1) and the decoded data C(1) and C(2). The second compensation section 8 performs calculation of the above expression (1) to generate a second compensated original picture S(3). The second compensated original picture S(3) is encoded in the third encoding section 3, and output from a communication line 23 of a third channel. The operation similar to that described above is performed for each of the total number of channels N.

On the other hand, the reception side has decoding sections 51, 52, 53, . . . connected to each of the number of channels N, and to each decoding section 51, 52, 53, . . . are connected switches 54, 55, 56, . . . expressed simply. These switches 54, 55, 56, . . . represent the state of the channel such as a mobile application, and if the channel is interrupted due to some reason (for example, because it is in a shadow of a building), the switch is opened. The image data received by the N channel and decoded by the decoding section 51, 52, 53, . . . is added by an adder 57 and averaged by an averaging section 58, and the image data is output as an output image signal R.

If the output image signal R is expressed by an expression, the following expression (2) is obtained:

$$R = \sum_{k=1}^{N} C(k) \times P(k) \bigg/ \sum_{k=1}^{N} P(k) \tag{2}$$

where P(k) (k=1, . . . , N) is 0 (when data cannot be received) or 1 (when data can be received).

FIG. 2 shows the operation on the transmission side in FIG. 1 schematically. From this figure, it can be seen that the first compensated original picture S(2) becomes {(S(1)−C(1)}/(N−1)+S(1), and the second compensated original picture S(3) becomes [{(S(1)−C(1)}+{(S(1)−C(2)}]/(N−2)+S(1). Looking at these first and second compensated original pictures S(2), S(3), it is seen that the first and second compensated original pictures S(2), S(3) are the ones obtained by adding to the original picture S(1) a value obtained by dispersing an encoding error occurred in the first and second encoding sections 1, 2 to the remaining channels.

Therefore, if the reception side decodes the encoded data of the N channel from the transmission side and adds these data for averaging, the encoding error occurred due to encoding on the reception side can be compensated as much as possible, and the encoding efficiency can be sufficiently improved. Moreover, according to the present embodiment, each channel includes the original picture S(1), and it is obvious that it is not required to transmit the basic data preferentially.

FIG. 3 shows the encoding efficiency of time scalability (channel 2) (a dotted curve a), and time scalability (channel 3) (a dotted curve b), which is known to have excellent encoding efficiency, and the encoding efficiency of N=2 (curve c), N=3 (curve d), and N=4 (curve e) measured in this embodiment. From this figure, it is seen that the encoding efficiency according to the present invention is not inferior to that of the time scalability. Moreover, it is seen that with an increase of N, SNR is improved.

FIG. 4 shows the encoding efficiency of each pattern, in the case where Q (quantization step S size)=4, and N=5, and the reception side receives with pattern 1 of channel 1, channel 1+2, . . . , channel 1+2+3+4+5, pattern 2 of channel 1, channel 1+3, . . . , channel 1+3+5, and pattern 3 of channel 5, channel 5+4, . . . , channel 5+4+3+2+1. Curves p, q and r in the figure show, respectively, encoding efficiency corresponding to the pattern 1, 2 and 3. Moreover, for example, in the curve p, points p1, p2, p3, p4 and p5 show an SNR value at the time of receiving with ch1, ch1+2, ch1+2+3, ch1+2+3+4 and ch1+2+3+4+5, respectively. Each point on the other curves q and r is likewise.

As is obvious from the figure, since either of each curve p, q, r is upward slanting to the right, it is seen that as the number of channels decoded on the reception side increases, the encoding efficiency is improved largely.

As is obvious from the above description, according to the present invention, an apparatus for dividing, compressing and transmitting video data that can sufficiently improve the encoding efficiency without requiring preferential transmission of the basic data can be provided. Moreover, there can be provided an image encoding and transmitting apparatus using multi-channels which give high synthetic image quality on the reception side.

Moreover, according to the present invention, video data can be divided, encoded and transmitted, only by performing quite simple operation such as arithmetic operation, other than normal encoding and decoding processing.

What is claimed is:

1. An apparatus for dividing, compressing and transmitting video data that uses a plurality of channels for transmission, comprising:
   a first encoding section for encoding an original picture and transmitting an encoded picture with a first channel;
   a first compensation section for generating a first compensated original picture obtained by adding to said original picture a value obtained by dispersing an encoding error occurred in said first encoding section to the remaining channels; and
   a second encoding section for encoding said first compensated original picture and transmitting an encoded compensated picture through a second channel, wherein when said first compensated original picture is designated as S(2), said S(2) is expressed by the following expression (3);

$$S(2) = \{(S(1)-C(1))/(N-1)+S(1) \tag{3}$$

wherein S(1) denotes an original picture, C(1) denotes decoded data, and N denotes the total number of channels.

2. An apparatus for dividing, compressing and transmitting video data that uses a plurality of channels for transmission, comprising:
   a first encoding section for encoding an original picture and transmitting an encoded picture with a first channel;
   a first compensation section for generating a first compensated original picture obtained by adding to said original picture a value obtained by dispersing an encoding error occurred in said first encoding section to the remaining channels;
   a second encoding section for encoding said first compensated original picture and transmitting an encoded compensated picture through a second channel,
   an i-th (i=2, 3, . . . , N−1) compensation section for generating an i-th compensated original picture obtained by adding to said original picture a value obtained by dispersing an encoding error occurred in an i-th encoding section to the remaining channels; and
   an (i+1)-th encoding section for encoding said i-th compensated original picture and transmitting an encoded i-th compensated picture through an (i+1)-th channel, wherein when said i-th compensated original picture is designated as S(i+1), said S(i+1) is expressed by the following expression (4), $$S(i+1) = \{S(1) \times i - \sum_{k=1}^{i} C(k)\}/(N-i) + S(1) \tag{4}$$

wherein S(1) denotes an original picture, C(k) denotes decoded data, and N denotes the total number of channels.

* * * * *